Figure 1:
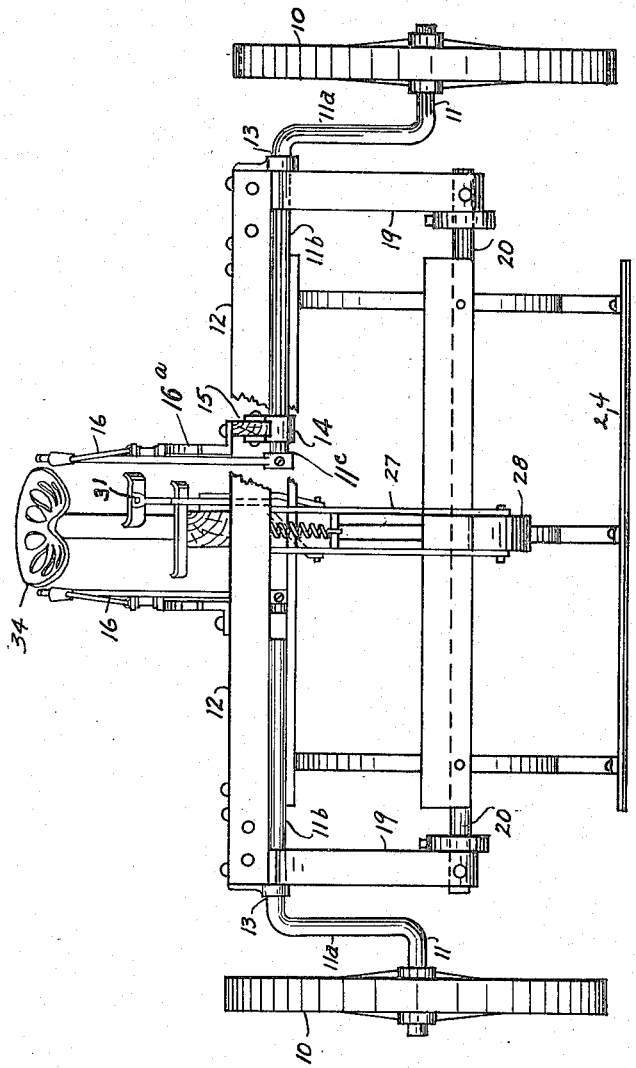

S. A. WEITMAN.
WEEDER.
APPLICATION FILED OCT. 18, 1913.

1,144,013.

Patented June 22, 1915.
2 SHEETS—SHEET 1.

WITNESSES:
H. M. Wiley
Roy Roberts

INVENTOR
Samuel A. Weitman
BY
L. L. Westfall ATTORNEY

S. A. WEITMAN.
WEEDER.
APPLICATION FILED OCT. 18, 1913.
1,144,013.
Patented June 22, 1915.
2 SHEETS—SHEET 2.
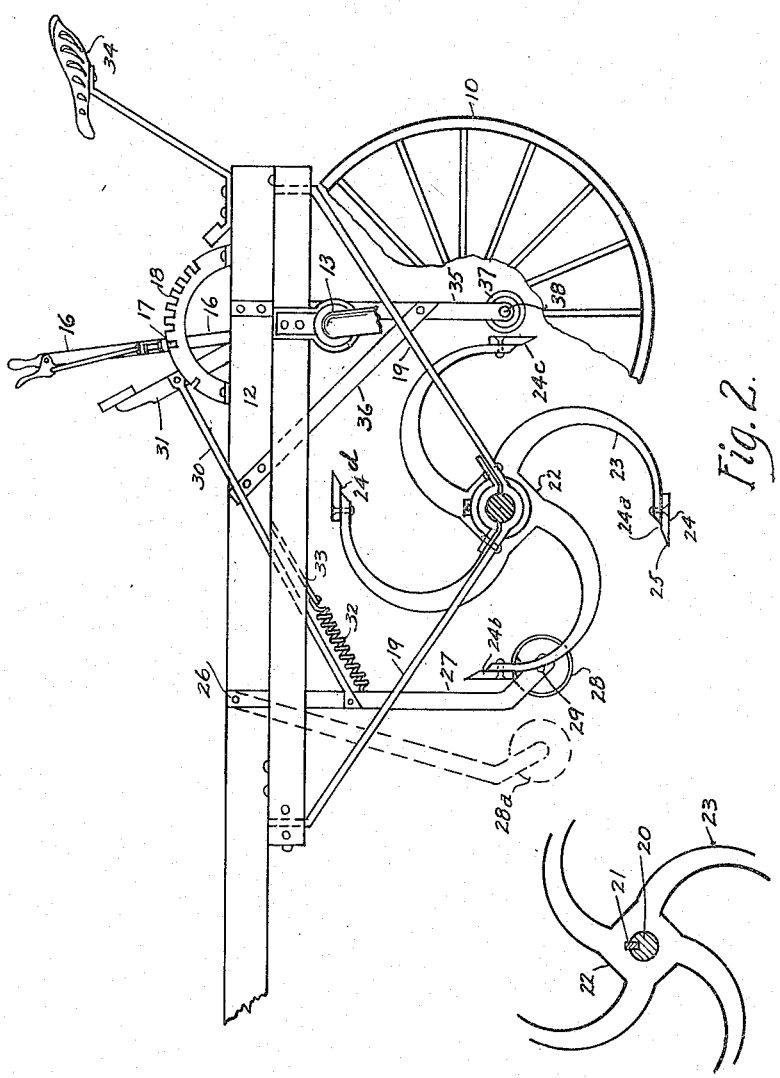
WITNESSES:
H. M. Wiley
Roy R. Roberts
INVENTOR
Samuel A. Weitman
BY
L. L. Westfall
ATTORNEY

UNITED STATES PATENT OFFICE.

SAMUEL A. WEITMAN, OF THORNTON, WASHINGTON.

WEEDER.

1,144,013.  Specification of Letters Patent.  Patented June 22, 1915.

Application filed October 18, 1913. Serial No. 795,919.

*To all whom it may concern:*

Be it known that I, SAMUEL A. WEITMAN, a citizen of the United States of America, residing at Thornton, in the county of Whitman and State of Washington, have invented certain new and useful Improvements in Weeders, of which the following is a specification.

This invention pertains to weeders and has for its object to provide a construction for field weeding that is adapted for weeding extensively.

As shown in the drawings, the weeder is adapted for being drawn by horses, and consists generally of a system of blades attached to arms radiating from a shaft adapted to rotate, one blade at a time being adapted to run through the dirt beneath the surface and sever the weeds or vegetation. When the operating blade becomes clogged with vegetation, the mechanism is rotated to the extent of substituting a new blade in the earth and allowing the previously operating blade to clear itself of the vegetation.

Means are provided for releasing the blades for rotation and for checking the same, also for adjusting the depth of the operating blade in the earth.

The mechanism is mounted on a truck and equipped with operating levers.

In the accompanying drawings forming a part of the specification, Figure 1, is a front elevation of the weeder with portions of the frame broken-away and the tongue or pole severed therefrom, Fig. 2, is a broken-away side elevation of the weeder, and Fig. 3 is a transverse sectional view of the shaft that carries the arms that supports the blades, together with a broken-away view of the arms.

Each wheel 10 is mounted upon a separate axle 11 which is bent to form a substantially vertical portion $11^a$ and re-bent to form a substantially horizontal portion $11^b$. The portions $11^b$ are journaled to the frame 12, as at 13 and 14. To the frame 12 is attached a rack $16^a$, as at 15. To the inner ends of the axle portions $11^b$ are rigidly secured, levers 16, as at $11^c$, having manually operated pawls 17. Suspended from the frame 12 by the brackets 19 is a horizontally arranged shaft 20, to which are keyed as at 21 (Fig. 3) hubs 22 carrying curved arms 23, to the outer ends of which are secured horizontally arranged blades 24 having cutting edges 25 at their forward extremities.

Pivoted to the frame 12, as at 26, is a downwardly extending arm 27 to the bottom of which is secured a roller 28 adapted to rotate on a shaft 29. A rod 30 connects the arm 27 and a foot lever 31. A coil spring 32 is attached to the arm 27 and is connected to the frame 12, as at 33.

A seat 34 is provided for the driver and operator.

By the use of the levers 16 attached to the axle portions $11^b$, whereby the frame 12 is thrown forward with relation to the wheels 10, the shaft 20 is adjusted so as to set the blades 24 in the proper positions for a substantial engagement with the earth when in a position directly underneath the shaft 20 as indicated by $24^a$ (Fig. 2). The blades 24 are held against rotation by the engagement of the blade $24^b$ upon the pulley 28.

If the blade $24^a$ becomes clogged with vegetation or other substances, by a forward pressure on the foot lever 31 the roller 28 is rotated out from under the blade $24^b$ to the position of the dotted line $28^a$, and the blade $24^a$ is rotated to the position of blade $24^c$ and blade $24^b$ is rotated to the position of blade $24^a$ and becomes the engaging blade and the blade $24^a$ is allowed to drop the substances gathered by engagement with the earth. Upon the release of the foot lever 31 the coil spring 32 returns the pulley 28 to normal position, and the blade $24^d$ is engaged thereby.

Suspended from the frame 12 is a support 35, made rigid by the brace 36, to the bottom of which is attached a roller 37 adapted to rotate on a hub 38. The roller 37 is stationed a short distance to the rear of the path of the blades 24 and serves as a support for the blades against any tendency to spring backward from the force of any sudden and severe contact of the cutting or engaging blade.

What I claim is,

A weeder comprising supporting wheels and an axle, a frame mounted on said axle, a cylinder suspended from said frame, said cylinder comprising a transversely arranged shaft adapted to rotate, arms radiating from such shaft, knives secured to the outer ends of such arms and paralleling the said shaft, a roller suspended from the said frame and normally occupying a space within the path of said knives, means for manually removing said roller from the path of the knives and for automatically returning the same thereto, and a support extending from the frame to a point in the rear of the blades to guard against the rearward springing of the blades.

In testimony whereof I have affixed my signature in presence of two witnesses.

SAMUEL A. WEITMAN.

Witnesses:
GEO. E. CANFIELD,
H. M. WILEY.

Copies of this patent may be obtained for five cents each, by addressing the "Commissioner of Patents, Washington, D. C."